Patented June 24, 1947

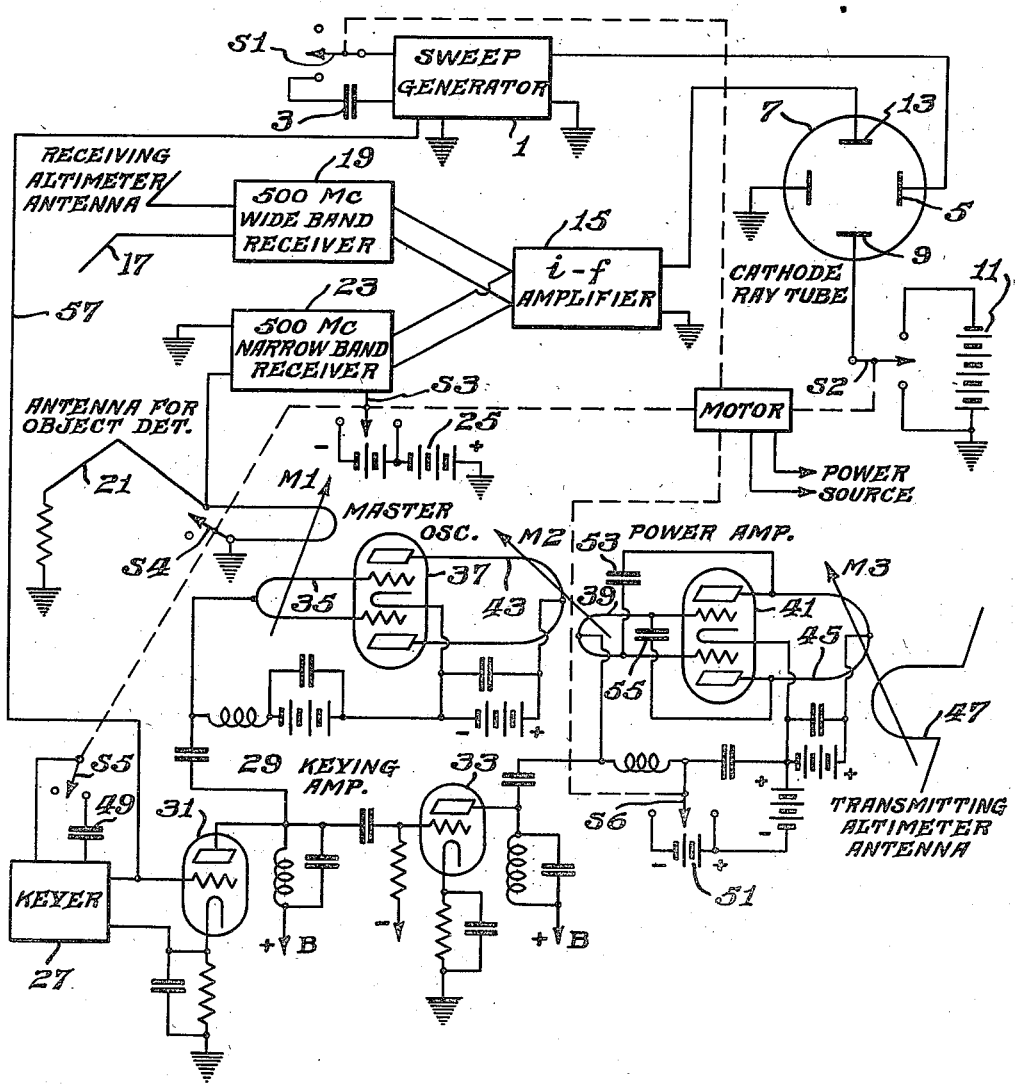

2,423,024

UNITED STATES PATENT OFFICE 2,423,024

RADIO PULSE ALTIMETER AND OBJECT DETECTOR

William D. Hershberger, Haddonfield, N. J., assignor to Radio Corporation of America, a corporation of Delaware Application December 26, 1941, Serial No. 424,530

13 Claims. (Cl. 250—1.66)

This invention relates to improvements in radio pulse altimeters and object detectors, and particularly to a radio pulse system in which altitude may be measured and objects detected alternately by means including partly common apparatus energized by a simple switching means.

Altitude may be measured by radiating a pulse of radio frequency energy toward the earth and by timing the interval between the radiation of the pulse and the reception of the pulse after it is reflected from the earth. For any altitude, the pulse length must be short enough to permit the radiation to be completed before the reception of the reflected pulse. If the pulse is not short, the receiver may be blocked or it may be difficult to distinguish the outgoing and incoming pulses. By way of example, a radio pulse will travel about 100 feet in 0.1 microsecond and, therefore, a pulse of 0.1 microsecond duration will travel 50 feet to a reflecting surface and back 50 feet to a receiver by the time the initial pulse radiation is completed.

While extremely short pulses are used in altimeters, longer pulses are used to detect objects because, generally, the range for object detection is of the order of 0.1 mile to 100 or more miles. For object detection, a pulse length of 0.5 microsecond provides sufficient resolution and permits the application of increased power. Not only are the pulse durations different for altitude determining pulses and for object detecting pulses, but also the time constants of the receivers are chosen to pass only the component frequencies of the two types of pulses.

In the practical design of radio pulse generators, it is very difficult to provide an oscillator which will start quickly and stop abruptly; for example, start and stop in 0.1 microsecond. The difficulty is due to the high ratio of reactance to resistance, which is essential for good oscillatory characteristics, and the low ratio of reactance to resistance, which is required if the oscillations are to stop abruptly. These opposite characteristics cannot be obtained in a single pulse generator but, by a novel arrangement of master oscillator and power amplifier, as proposed by the instant invention, the two types of pulses may be obtained.

One of the objects of the present invention is to provide an improved means for measuring altitude and for detecting objects. Another object is to provide an improved means for generating short and long pulses of radio frequency energy. Another object is to provide improved means for measuring altitude and for detecting objects by energizing alternately, at least partially, common elements whereby the weight and power requirements are reduced. An additional object is to provide an improved and simplified switching apparatus for a radio pulse altimeter and object detector.

The invention will be described by referring to the accompanying drawing, which is a schematic circuit diagram of one embodiment of the invention.

Referring to the drawing, a sweep generator 1 is provided with a switch S1 which connects or disconnects a capacitor 3 to change the frequency of the timing sweep voltage. The output of the sweep generator is applied to the horizontal deflecting elements 5 of a cathode ray indicator 7. One of the vertical deflecting elements 9 is connected through a switch S2 to ground or to a biasing source 11 to obtain separate sweeps which distinctively indicate the altitude or object. The other vertical deflecting element 13 is connected to the output of the I.-F. amplifier 15 which may include a detector.

The I.-F. amplifier 15 has two input sources. One of these sources includes a receiving altimeter antenna 17 and a 500 megacycle receiver and local oscillator 19. The other of these sources includes a directional receiving antenna, such as a half rhombic 21, for object detection, and a 500 megacycle narrow band receiver and local oscillator 23. The narrow band receiver 23 is provided with a switch S3 which may be used to bias off the receiver by applying a biasing voltage from a battery 25 or the like. The object detection antenna 21 may include a short circuit S4 for reducing the antenna response when the altimeter is in operation.

The transmitter includes a keyer 27 which is connected to a keyer amplifier 29. The keyer amplifier consists of two or more thermionic tubes 31, 33. The tubes 31, 33 may be connected as shown and may employ circuit elements according to the allowed copending application Serial No. 182,418, filed December 30, 1937, by Irving Wolff, Patent Number 2,403,624, granted July 9, 1946, for improvement in Apparatus for and method of pulse keying. The output of the first tube 31 is applied to the grid circuit 35 of a master oscillator 37. The output of the second tube 33 is applied to the grid circuit 39 of a power amplifier 41. The grid circuit 35 of the master oscillator is coupled through mutual coupling M1 to the object detection antenna 21. The anode circuit 43 of the master oscillator is coupled through mutual coupling M2 to the grid circuit 39 of the power amplifier. The anode circuit 45 of the power amplifier is coupled through mutual coupling M3 to the transmitting altimeter antenna 47.

If the maximum altitude and the maximum object detection ranges are greatly different, different keying rates will be required. The keying rate change may be effected by a switch S5 which connects an additional timing capacitor 49 to the timing circuit in the keyer 27. The master oscillator and the power amplifier are both biased normally to cut-off. When the object detection system is in operation, an additional bias is applied by way of switch S6 which connects a bias battery 51 to the grid circuit of the power amplifier 41. The power amplifier is carefully neutralized, by capacitors 53, 55 cross-connected between the grids and the anodes of the power amplifier tubes, to prevent energy from the master oscillator passing through the blocked power amplifier to the altimeter antenna 47.

The operation of the system is as follows: When the switches S1, S2, S3, S4, S5 and S6 are set for object detection, the master oscillator is energized by the keying pulse applied from the keyer amplifier 29. The radio frequency pulse generated by the master oscillator is applied to the antenna 21 for object detection and is radiated toward the object to be detected. The radio frequency pulse cannot reach the altimeter antenna because the additional bias applied through switch S6 blocks the power amplifier. The sweep generator 1, which is synchronized by keyer currents applied through lead 57, generates a slow sweep voltage which is applied to the cathode ray horizontally. The echo pulse received on the antenna 21 is applied through the narrow band receiver 23, which is placed in operating condition by the bias applied, through switch S3 and I.-F. amplifier 15, to the vertical deflecting electrodes 9, 13 to deflect the ray horizontally or at a discernible angle to its vertical sweep trace. The sweep trace, as is well known, may be calibrated to indicate the distance of the pulse reflecting object.

When the switches S1, etc., are connected for altitude determination, the object detection antenna is short circuited and the narrow band receiver 23 is biased off so that the altitude determining pulse does not affect the object detecting system. At the same time, the object detection system is made inactive, the master oscillator 37 is keyed on and a shorter keying pulse is applied to key on the power amplifier 41. Thus a portion of the master oscillator pulse is amplified and shortened, and is radiated toward the earth. The pulse, after reflection from the earth, is applied by way of the receiving antenna 17, broad band receiver 19 and I.-F. amplifier 15 to the vertical deflecting elements 9, 13 to deflect vertically the horizontal timing sweep which is moved to a distinctive position by the steady bias applied through switch S2. If the maximum altitude is substantially less than the maximum range of the object detection system, the keyer and sweep generator rates may be increased by disconnecting the capacitors 3 and 49 by means of switches S1 and S5, respectively.

Thus the invention has been described as an improved radio pulse altimeter and object detector. The pulse for object detection is derived by keying a master oscillator; the shorter pulse for altitude measurement is derived by passing the pulse from the master oscillator through a power amplifier which is keyed on for only a portion of the master oscillator keying time. Since the power amplifier does not have to start into oscillation and thereafter allow the oscillations to die out, it is practical to key abruptly on and abruptly off. The reflected pulses are applied respectively through two radio frequency amplifier channels and hence to a cathode ray tube indicator upon which the timing sweep voltages are impressed.

The switching may be done manually as desired, or continuously by a motor operating the switches at a rate above the persistence of vision, or by means of electronic switching of the character described in an article entitled "Some electronic switching circuits," by C. C. Shumard, published May, 1938, in "Electrical engineering." Although the transmitter and receiver have been described as connected or coupled directly to the object detection antenna, it should be understood that the connection may include the decoupling means disclosed in copending application Serial No. 184,354, filed January 11, 1938, by Wolff and Hershberger, Patent Number 2,401,717 granted June 4, 1946, for improvement in Signalling systems.

In the intermittent operation, very high peak powers may be applied without overloading the tubes. Another advantage is that the power amplifier may be fully loaded in contrast to the relatively small loads which may be applied to an oscillator which has to be started and stopped. If the intermittent operation is at a suitable rate, both the altimeter and object detection signals may be viewed simultaneously due to the persistence of the cathode ray tube screen.

I claim as my invention:

1. A radio pulse system for measuring altitude and for detecting objects including means for generating a pulse of radio frequency energy, means for radiating said pulse toward an object to be detected, means for receiving said pulse after reflection, an indicator connected to said receiving means for indicating the presence of the object by indicating the reception of said pulse, means for amplifying a portion of said generated pulse of radio frequency energy, means for radiating said amplified pulse toward the earth to measure altitude, means for receiving said amplified pulse after reflection from the earth, and means including said indicator for indicating distinctively the altitude by indicating the reception of said amplified pulse.

2. A radio pulse system for measuring altitude and for detecting objects including means for generating a pulse of radio frequency energy, an antenna coupled to said generating means for radiating said pulse toward an object to be detected, means for receiving said pulse after reflection from said object, a cathode ray indicator connected to said receiving means for indicating the presence of said object by indicating the reception of said reflected pulse, means for amplifying a portion of said generated pulse of radio frequency energy to obtain a shorter pulse of radio frequency energy, means for radiating said shorter pulse toward the earth to measure altitude, means for receiving said radiated shorter pulse after reflection from the earth, and means including said indicator for indicating the altitude in terms of the reception of said reflected shorter pulse.

3. A radio pulse system for measuring altitude and for detecting objects including a master oscillator for generating a pulse of radio frequency energy, an antenna coupled to said master oscillator for radiating said pulse toward an object to be detected, means for receiving said pulse after reflection from said object, a cathode ray indicator connected to said receiving means for indicating the presence of said object by indicating the reception of said reflected pulse, a power amplifier for amplifying a portion of said generated pulse of radio frequency energy to obtain a shorter pulse of radio frequency energy, means for radiating said shorter pulse toward the earth to measure altitude, means for receiving said radiated shorter pulse after reflection from the earth, and means including said indicator for indicating distinctively the altitude in terms of the reception of said reflected shorter pulse.

4. A radio pulse system for measuring altitude and for detecting objects including means for generating a pulse of radio frequency energy, an antenna coupled to said generating means for radiating said pulse toward an object to be detected, means for receiving said pulse after reflection from said object, means for generating a timing sweep voltage, a cathode ray indicator connected to said sweep voltage generator and to said receiving means for indicating the distance of said object by indicating the reception of said reflected pulse as a function of said sweep voltage, means for amplifying a portion of said generated pulse of radio frequency energy to obtain a shorter pulse of radio frequency energy, means for radiating said shorter pulse toward the earth to measure altitude, means for receiving said radiated shorter pulse after reflection from the earth, and means including said indicator for indicating distinctively the altitude in terms of the reception of said reflected shorter pulse as a function of said sweep voltage.

5. A radio pulse system for measuring altitude and for detecting objects including means for generating a pulse of radio frequency energy, an antenna coupled to said generating means for radiating said pulse toward an object to be detected, means for receiving said pulse after reflection from said object, means for generating a timing sweep voltage, means for altering said timing, a cathode ray indicator connected to said sweep voltage generator and to said receiving means for indicating the distance of said object by indicating the reception of said reflected pulse as a function of said sweep voltage, means for amplifying a portion of said generated pulse of radio frequency energy to obtain a shorter pulse of radio frequency energy, means for radiating said shorter pulse toward the earth to measure altitude, means for receiving said radiated shorter pulse after reflection from the earth, and means including said indicator for indicating distinctively the altitude in terms of the reception of said reflected shorter pulse as a function of said altered timing sweep voltage.

6. A radio pulse system for measuring altitude and for detecting objects including a master oscillator for generating a pulse of radio frequency energy, an antenna coupled to said master oscillator for radiating said pulse toward an object to be detected, means for receiving said pulse after reflection from said object, means for generating a timing sweep voltage, a cathode ray indicator connected to said sweep voltage generator and to said receiving means for indicating the distance of said object by indicating the reception of said reflected pulse as a function of said sweep voltage, a power amplifier for amplifying a portion of said generated pulse of radio frequency energy to obtain a shorter pulse of radio frequency energy, means for radiating said shorter pulse toward the earth to measure altitude, means for receiving said radiated shorter pulse after reflection from the earth, and means including said indicator for indicating distinctively the altitude in terms of the reception of said reflected shorter pulse as a function of said sweep voltage.

7. A radio pulse system for measuring altitude and for detecting objects including a master oscillator for generating a pulse of radio frequency energy, an antenna coupled to said master oscillator for radiating said pulse toward an object to be detected, means for receiving said pulse after reflection from said object, means for generating a timing sweep voltage, means for altering said timing, a cathode ray indicator connected to said sweep voltage generator and to said receiving means for indicating the distance of said object by indicating the reception of said reflected pulse as a function of said sweep voltage, a power amplifier for amplifying a portion of said generated pulse of radio frequency energy to obtain a shorter pulse of radio frequency energy, means for radiating said shorter pulse toward the earth to measure altitude, means for receiving said radiated shorter pulse after reflection from the earth, and means including said indicator for indicating distinctively the altitude in terms of the reception of said reflected shorter pulse as a function of said altered timing sweep voltage.

8. A radio pulse system according to claim 1 including means for transmitting selectively pulses derived from either said pulse generator or said pulse amplifier.

9. A radio pulse system according to claim 1 including means for energizing said radiating means alternately from said pulse generator and said pulse amplifier.

10. A radio pulse system according to claim 5 including means for energizing said radiating means alternately from said pulse generator and from said means for amplifying a portion of said generated pulse of radio frequency energy and for altering synchronously said timing.

11. A radio pulse system according to claim 5 including means for operating alternately said object detecting radiating means and said altitude radiating means and for synchronously decreasing and increasing the pulse rate and the sweep rate.

12. A radio system for measuring altitude and for detecting objects including means for generating a first radio signal, means for radiating said signal toward an object to be detected, means for receiving said signal after reflection, an indicator connected to said receiving means for indicating the presence of the object by indicating the reception of said signal, means including said generating means for establishing a second radio signal differing distinctively from said first signal, means for radiating said second signal toward the earth to measure altitude, means for receiving said second signal after reflection from the earth, and means including said indicator for indicating distinctively the altitude by indicating the reception of said second signal.

13. A radio pulse system for measuring altitude and for detecting objects including means for generating a pulse of radio frequency energy, means for radiating said pulse toward an object to be detected, means for receiving said pulse after reflection, an indicator connected to said receiving means for indicating the presence of the object by indicating the reception of said pulse, means including said generating means for establishing a second pulse of different distinctive characteristics than said first pulse, means for radiating said second pulse toward the earth to measure altitude, means for receiving said second pulse after reflection from the earth, and means including said indicator for indicating distinctively the altitude by indicating the reception of said second pulse.

WILLIAM D. HERSHBERGER.

REFERENCES CITED

The following references are of record in the file of this patent:

UNITED STATES PATENTS

| Number | Name | Date |
| --- | --- | --- |
| 2,248,215 | Budenbom | July 8, 1941 |
| 2,225,046 | Hunter | Dec. 17, 1940 |
| 2,207,267 | Plaistowe | July 9, 1940 |